(12) United States Patent
Wu et al.

(10) Patent No.: US 8,103,781 B1
(45) Date of Patent: Jan. 24, 2012

(54) MECHANISM FOR HANDLING PERSISTENT REQUESTS FROM STATELESS CLIENTS

(75) Inventors: Yuguang Wu, Santa Clara, CA (US); Junlan Zhou, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 203 days.

(21) Appl. No.: 12/434,473

(22) Filed: May 1, 2009

(51) Int. Cl.
G06F 15/16 (2006.01)
(52) U.S. Cl. .................. 709/227; 709/223; 709/228
(58) Field of Classification Search .......... 709/227–229, 709/223–225; 726/11–13
See application file for complete search history.

(56) References Cited

U.S. PATENT DOCUMENTS

| | | | | |
|---|---|---|---|---|
| 6,219,343 B1* | 4/2001 | Honkasalo et al. | ........... | 370/335 |
| 6,614,900 B1* | 9/2003 | Champoux | ................... | 379/229 |
| 6,680,906 B1* | 1/2004 | Nguyen | ........................ | 370/229 |
| 6,747,979 B1* | 6/2004 | Banks et al. | .................. | 370/401 |
| 6,970,921 B1* | 11/2005 | Wang et al. | .................... | 709/220 |
| 7,480,918 B2* | 1/2009 | Astl et al. | ..................... | 719/314 |
| 7,505,974 B2* | 3/2009 | Gropper | ................................ | 1/1 |
| 7,647,383 B1* | 1/2010 | Boswell et al. | ............... | 709/207 |
| 2001/0030785 A1* | 10/2001 | Pangrac et al. | ................. | 359/125 |
| 2003/0033541 A1* | 2/2003 | Edmark et al. | ................. | 713/201 |
| 2003/0198224 A1* | 10/2003 | Lee et al. | ........................ | 370/392 |
| 2004/0174872 A1* | 9/2004 | Kondapalli et al. | ........... | 370/389 |
| 2005/0228996 A1* | 10/2005 | Mayer | ........................... | 713/170 |
| 2008/0101225 A1* | 5/2008 | Tassinari et al. | .............. | 370/230 |
| 2009/0003216 A1* | 1/2009 | Radunovic et al. | ........... | 370/237 |
| 2009/0059941 A1* | 3/2009 | Callaway et al. | ............. | 370/412 |
| 2010/0138885 A1* | 6/2010 | Haimi-Cohen | ............... | 725/109 |

OTHER PUBLICATIONS

"OSI School ARP Basic Tutorial" [online] [retrieved on Feb. 21, 2009] http://www.osischool.com/protocol/arp/basic/index/.php.
"ARP—Address Resolution Protocol (ARP within a Subnet)" [online] (Feb. 3, 2002) http://www.eventhelix.com/RealtimeMantra/Networking/Arp.pdf.
"Rambling Comments" Len Holgate's thoughts on this and that . . . Mainly test driven software development in C++ on Windows platforms . . . [online] [retrieved on Feb. 18, 2009] http://www.lenholgate.com/archives/000476.html.
*Department of Security Engineering School of Engineering, Blekinge Institute of Technology* "Denial of Service on SIP VoIP Infrastructures Using DNS Flooding—Attack Scenario and Countermeasures" (Mar. 2007).

* cited by examiner

*Primary Examiner* — Brendan Higa
(74) *Attorney, Agent, or Firm* — Fish & Richardson P.C.

(57) ABSTRACT

In general, one aspect of the subject matter described in this specification can be embodied in a method that includes receiving at a first device a first request for a physical address of a second device different from the first device, wherein the first request specifies a network address of the second device, and determining that a set of pending requests has a maximum number of requests, wherein the set of pending requests is ordered based on when the requests were received by the first device. The method can further include removing an oldest request from the pending requests and adding the first request to the pending requests, and processing a newest request in the pending requests by sending a message to the second device and receiving the physical address responsive to the message.

18 Claims, 6 Drawing Sheets

MECHANISM FOR HANDLING PERSISTENT REQUESTS FROM STATELESS CLIENTS

BACKGROUND

The present disclosure relates to server processing of client requests.

A client can request a server to process a request for information. In response, the server can process the request and return the requested information to the client. When a client has a persistent request (e.g., a request for updated information sent out at regular intervals), the client is generally tasked with remembering to continuously send the request to a server for processing. In such a client-server scheme, the client is referred to as "stateful" (the client is charged with remembering the state of the request) and the server is referred to as "stateless" (the server processes each request as it is received without having to remember to make or process future requests).

SUMMARY

This specification describes technologies relating to processing of client requests using a stateful server and a stateless client.

In general, one aspect of the subject matter described in this specification can be embodied in a method that includes receiving at a first device a first request for a physical address of a second device different from the first device, wherein the first request specifies a network address of the second device, and determining that a set of pending requests has a maximum number of requests, wherein the set of pending requests is ordered based on when the requests were received by the first device. The method can further include removing an oldest request from the pending requests and adding the first request to the pending requests, and processing a newest request in the pending requests by sending a message to the second device and receiving the physical address responsive to the message.

These and other embodiments can optionally include one or more of the following features. The second device can be on a same subnet as the first device and the physical address can be that of the second device. The second device can be on a different subnet as the first device and the physical address can be that of a router. The physical address can be a Media Access Control (MAC) address and the message can be an Address Resolution Protocol (ARP) request. The first request can specify a network interface on the first device and the set of pending requests can be for the specified network interface. A pending request can be associated with a respective timer, the method can further can include processing the pending request when the respective timer expires and denoting the pending request as the newest request in the set of pending requests.

The method can further include receiving at the first device a second request for a physical address of a third device different from the first device, wherein the second request specifies a network address of the third device, identifying the second request in the set of pending requests and denoting the second request as the newest request in the set of pending requests, and processing the newest request in the pending requests to obtain a physical address for the third device.

The method can additionally include receiving at the first device a second request for a physical address of a third device different from the first device, wherein the second request specifies a network address of the third device, and identifying a third request in the set of pending requests that corresponds to the third device. The method can further include determining that the network address specified in the second request and a network address specified in the third request differ, removing the third request from the pending requests and adding the second request to the pending requests, and processing the newest request in the pending requests to obtain a physical address for the third device.

The method can also include receiving at the first device an instruction to remove the first request from the set of pending requests, and removing the first request from the pending requests.

Particular embodiments of the subject matter described in this specification can be implemented to realize one or more of the following advantages. By processing persistent requests using a stateless client and a stateful server, client functions become simpler and hence easier to implement. The efficiency by which clients and servers handle persistent requests is increased. For instance, traffic between a client and a server regarding a persistent request is decreased because the server handles the persistent request without the client's continuous direction. Additionally, by limiting the number of persistent requests to a maximum number, the server more efficiently manages its own resources and guards against server slowdown or shutdown due to a high volume of requests (e.g., a denial-of-service (DOS) attack).

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
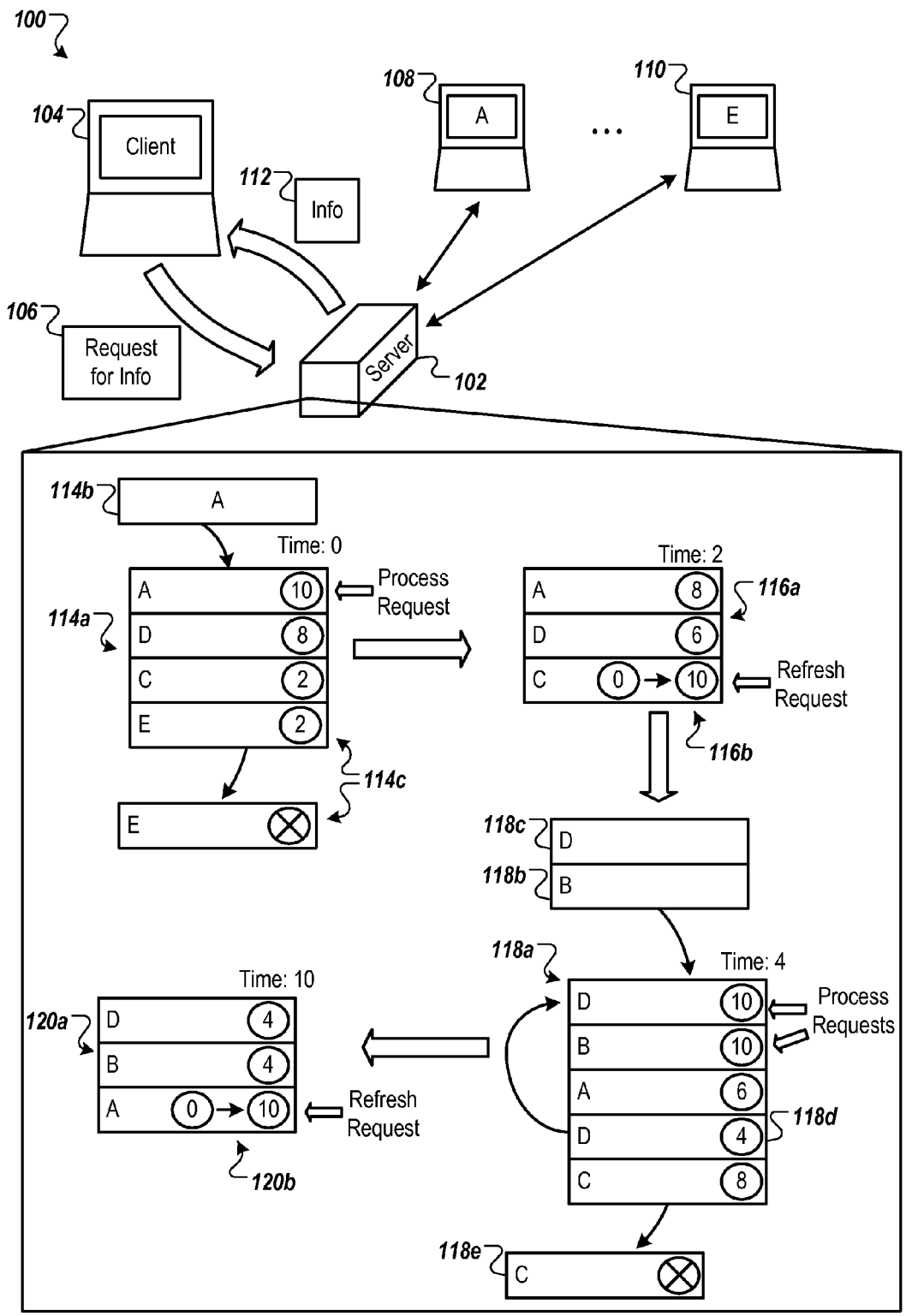
FIG. 1 shows a diagram illustrating example processing of persistent client requests using a stateful server and a stateless client.

FIG. 1 shows a diagram 100 illustrating example processing of persistent client requests using a stateful server 102 and a stateless client 104 (device A). The client 104 sends the server 102 a persistent request 106 for information related to another device (e.g., a computer, a server, a portable device, etc.). The persistent request 106 can be a request that is continually processed by the server 102 at recurring intervals or other times so as to keep the requested information updated.

For example, the client 104 can be an address resolution protocol (ARP) client and the persistent request 106 can be a persistent ARP request made to an APR server (the server 106). An ARP request (request 106) specifies an internet protocol (IP) address for another device. Based upon the IP address contained in the ARP request (request 106), the ARP server (server 102) can identify the media access control (MAC) address for the device at the specified IP address. Based upon the persistent ARP request (request 106) received from the ARP client (client 104), the ARP server (server 102) can continuously query the MAC address of the device located at the specified IP address to determine whether the associated MAC address has changed. Since the ARP server (server 102) is stateful and the ARP client (client 104) is stateless, the ARP server (server 102) continuously checks the IP to MAC address mapping without the ARP client (client 104) having to make more than one request.

An IP to MAC address mapping can be modified if a networking interface (e.g., modem, Ethernet card, wireless interface, etc.) associated with the IP address changes. A device is associated with one unique MAC address per networking interface contained within the device. Unless a networking interface is replaced, a device is tied to its associated MAC addresses (e.g., a device's associated MAC addresses do not change unless a networking interface is replaced). Since each networking interface for a device is associated with an IP address, a MAC address for each networking interface is also associated with an IP address. Thus, an IP to MAC address mapping can change if the associated networking interface changes. For example, the networking interface can change if the networking interface is replaced (e.g., installation of a new Ethernet card) or a different device is associated with the IP address (e.g., a different device is plugged into an Ethernet cable associated with a static IP address).

Devices within a local area network (LAN) or a subnet use MAC addresses to identify and communicate with each other. Persistent requests are placed on the ARP server (the server 102) so that, if a change in the IP to MAC address mapping does take place, that change will be promptly identified and resolved so that communication between devices on the LAN or subnet can continue with minimal interruption.

The persistent request 106 is a request for information related to another device, such as a device A 108, a device E 110, and devices C-E (not depicted). The client 104 and the server 102 can be part of the same device (e.g., the client 104 can be a ARP client and the server 102 can be an ARP server contained in the same device) or they can be separate devices. The devices A-E (108-110) contained within the same network (e.g., LAN, subnet, etc.) as the client 104 and the server 102. The devices A-E (108-110) are connected to the sever 102, directly or indirectly, through a networking interface on the server 102. For example, the devices A 108 can be communicatively connected to an Ethernet card (a networking interface) in the server 102 through an Ethernet cable.

Upon receiving the persistent request 106 from the client 104, the server 102 places the persistent request 106 into a list of persistent requests to be continually processed. The list can store a fixed number of persistent requests. If adding the persistent request 106 to the list of persistent requests increases the length of the list above a maximum number of persistent requests (the fixed length of the list), then the server 102 removes one of the existing persistent requests from the list. By keeping the list to a fixed size, the server 102 is less likely to run out of resources or to be susceptible to a high volume of requests (e.g., a DOS attack).

The server 102 can determine which of the existing persistent requests to remove from the list based upon an order within which the existing requests were received by the server 102. For example, the server 102 can remove the existing request that was least recently received (e.g., the server 102 can use a least-recently-used (LRU) list). By removing the least recently received request from the list, the server 102 places the greatest value on the most recently received request. If the received request 106 is already on the list of existing persistent requests, the server 102 can use the time at which the persistent request 106 was received for determining which existing persistent request to remove.

The server 102 can order the list of existing persistent requests according to the order in which the requests are received. The top (or front) of the list can correspond to the most recently received request and the bottom (or back) of the list can correspond to the least recently received requests. When a newly received request is added to the top of the list and the maximum length of the list is exceeded, the server 102 can remove the request at the bottom of the list. When the received request 106 is already on the list of existing persistent requests, the server 102 can move the existing request entry on the list that corresponds to the received request 106 to the top of the list.

The server 102 can initially process the request 106 when it is received. The server 102 continually processes the persistent request 106 (e.g., refresh the requested information) at various times as long as it is on the list of existing persistent request. In some implementations, the server 102 continually processes the request 106 using a timer associated with the request 106. Upon expiration of the associated timer, the server 102 processes the associated request (e.g., refreshes the requested information) and resets the timer. In further implementations, the server 102 additionally moves the request 106 to the top of the list when its associated timer is reset, so that the request 106 is indicated as the newest request.

For example, for a persistent ARP request (request 106) for the MAC address of device A 108 received from the ARP client (client 104), the ARP server (server 106) can add the ARP request (request 106) to the list of persistent ARP requests and set an associated timer. When the timer associated with the ARP request (request 106) expires, the ARP server (server 106) processes the APR request (request 106) by sending out an ARP request to device A 108 for its MAC address. The ARP server (server 106) additionally resets the timer associated with the ARP request (request 106) repeats these steps as long as the ARP request (request 106) is still on the list of persistent ARP requests (e.g., the ARP request (request 106) has not been removed from the list by the ARP server (server 106)).

In some implementations, the server 102 uses a global timer that, upon expiration, signals to the server 102 to process some or all of the requests on the list. Once a request is removed from the list of existing persistent requests by the server 102, the removed request is no longer processed. For example, in such implementations, an ARP server (server 106) processes an ARP request (request 106) (and any other ARP requests contained on the list of existing ARP requests) by sending an ARP request to device A 108 each time a global timer for the ARP server (server 106) expires.

The actions performed by the server 102 upon receiving a response to a processed request can vary. In some implementations, the server 102 sends the requested information 112 (the information specified in the request 106) to the client 104. For example, upon receiving the MAC address associated with device A 108 as a response to the ARP request (request 106), the ARP server (server 102) can send the received MAC address to the ARP client (client 104). In some implementations, the server 102 updates an associated data table or repository using the requested information 112. In such implementations, the data table or repository that is updated is available to be accessed by the client 104 as desired. For example, upon receiving the MAC address associated with device A 108 as a response to the ARP request (request 106), the ARP server (server 102) can update an ARP table (a table storing IP to MAC address mappings for devices on a network) using the received MAC address. In such an example, the ARP client (client 104) can access the ARP table and retrieve the MAC address for the device A 108 whenever the APR client (client 104) needs to communicate with the device A 108.

Also depicted in diagram 100 is an example progression of a list 114a-120a of persistent requests used by the server 102 to manage existing persistent request as well as newly received requests 114b, 118b, and 118c. The requests on the list 114a-120a are for information relating to devices A-E (108-110) received from the client 104. In this example, the list 114a-120a has a fixed size of three persistent requests, the requests on the list 114a-120a are ordered according the when they were received (e.g., the most recently received request is at the top of the list), and each persistent request on the list 114a-120a has an associated timer. Additionally in this example, upon receiving a request the server 102 processes the received request, adds the request to the list 114a-120a, and sets an associated timer. Also, in this example expiration of an associated timer causes the server 102 to process the associated persistent request on the list 114a-120a and resets the timer. Although in some implementations the server 102 also moves a request to the top of the list when its associated timer expires, this example does not provide such a depiction. This example is provided to illustrate the description above.

At time zero (0) of this example, the server 102 receives a persistent request 114b for information related to the device A 108. The server 102 adds the request 114b to the top of list 114b, sets the associated timer for the request 114c to 10 (an example default value), and initially processes the request 114b. The server 102 removes the request 114c for information related to device E 110 from the list 114a because, with addition of the request 114c, the list 114a exceeds its maximum size (three persistent requests) and the request 114d is at the bottom of the list (the request 114d is the least recently received request). The request 114c is removed from the list 114a before expiration of its associated refresh timer.

In other implementations, the server 102 does not initially process a new request (e.g., the request 114a) when it is added to the list of requests (e.g., the list 114a). In such implementations, the server 102 processes the new request when its associated timer expires. Such implementations can be used to protect against problems associated with a high volume of requests being received by the server 102 (e.g., a DOS attack). For instance, a large backlog of received requests waiting to be initially processed can be created during a period of high volume if each request is processed as it is received. In some implementations, the server 102 is able to shift between initially processing requests as they are received and delaying processing based upon a current volume of requests.

At time two (2) of this example, the timer associated with request 116b for information regarding device C expires (e.g., the associated timer reaches zero). Since the request 116b is still on the list 116a of persistent requests when its associated timer expires, the server 102 processes the request 116b (refreshes the requested information associated with request 116b).

At time four (4) of this example, the server 102 receives first a persistent request 118b for information related to device B and second a persistent request 118c for information related to device D. First, the server 102 adds the request 118b for device B to the list 118a, sets an associated timer, and processes the request 118b. Second, having identified that a request 118d for device D is already on the list, the server 102 moves the request 118d to the top of the list, resets the associated timer, and processes the request 118d (refreshes the requested information associated with the request 118d). The server 102 removes the request 118e related to device C from the list 118a because, with moving the request 118d related to device D to the top of the list 118a, the maximum size for the list 118a is exceeded.

In other implementations, when a request that is already on the list 114a-120a is received, the server 102 moves the request to the top of the list 114a-120a but does not reset its associated timer or process the request. In such implementations, the server 102 refreshes the requested information for the received request when the associated timer expires. Such implementations can be used to protect against a large influx of the same request (e.g., the request 118c) being received by the server (e.g., a DOS attack). Instead of processing the same request each time it is received, the server 102 can process the request at set intervals dictated by the requests associated timer. In some implementations, the server 102 is able to switch between the two implementations depending on the volume of requests.

At time ten (10) of this example, the server 102 processes the request 120b regarding device A 108 again (it is initially processed at time zero (0) when it is received as request 114b) because its associated timer has expired and it is still located on the list 120a. By processing the request 120b, the desired information regarding device A 108 is refreshed (e.g., any changes in the desired information will be updated when the request 120b is reprocessed).

Figure 2:
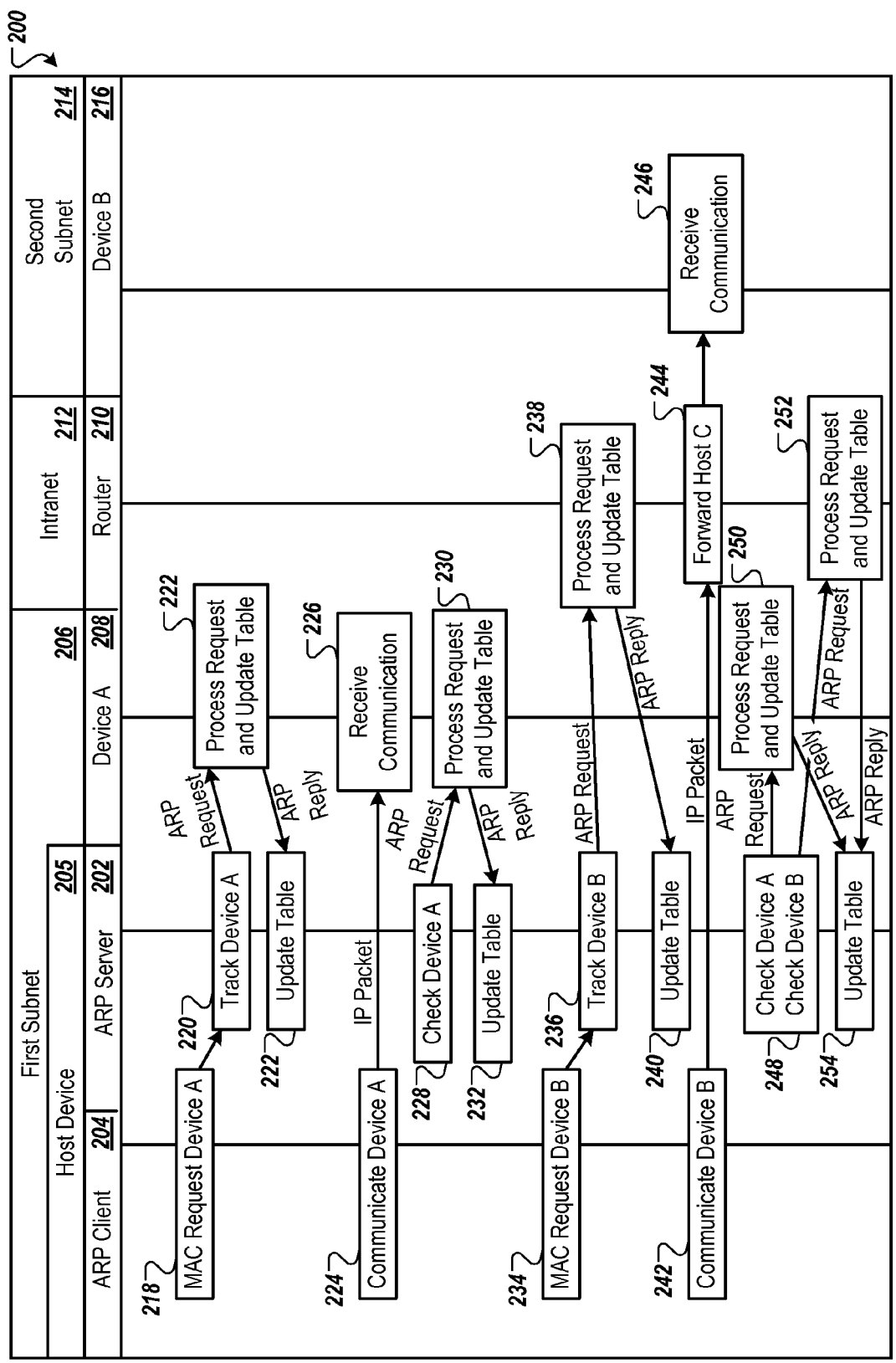
FIG. 2 shows a diagram illustrating example processing of persistent ARP requests using a stateful ARP server and a stateless ARP client.

FIG. 2 shows a diagram 200 illustrating example processing of persistent ARP requests using a stateful ARP server 202 and a stateless ARP client 204. The diagram 200 illustrates example interactions between the stateful ARP server 202 and the stateless ARP client using a fixed-size list of requests, as described above with reference to FIG. 1. This example ARP implementation is presented as one of many possible implementations. The features described below with regard to this ARP implementation are applicable to other, non-ARP implementations.

For instance, the below described features are applicable to a non-ARP implementation that automatically refreshes real-time information in a web browser, such as stock market data and quotes. Instead of relying on the web browser to actively probe for the data, a server (such as the ARP server 202) can arrange for updated data to be transmitted to a web browser (a client, such as the ARP client 204) whenever a change in the data has occurred.

In this example diagram 200, the ARP server 202 and the ARP client 204 are contained within the same host device 205. In some implementations, the APR server 202 and the ARP client 204 can be processes running on the host device 205, such as an ARPDaemon process and an ARPDaemon client process, respectively. For example, if the host device 205 is a high-speed switch or router that transmits data traffic, then the ARP client 204 can be a process on the switch or router responsible for accurately transmitting data and the ARP server 202 can be a process responsible for persistently updating MAC addresses so that the ARP client 204 avoids transmitting traffic to a stale (no longer current) MAC address.

In other implementations not depicted in the diagram 200, the ARP server 202 and the ARP client 204 are on distinct devices. For example, the ARP server 202 and the ARP client 204 can be implemented across devices that do not require ARP resolution (e.g., a peer-to-peer connection between devices) or across devices using a separate (out-of-band) ARP resolution method for maintaining communication.

The host device 205 is located on a first subnet 206. Device A 208 is communicatively connected to the host device 205 and is also on the first subnet 206. A router 210 is communicatively connected to the host device 205 and is located on an intranet 212 connecting multiple subnets together (a subnet includes a group of networked devices that share a common IP address, an intranet includes a group of networked devices using Internet protocols and IP addresses). The router 210 connects the first subnet 206 with a second subnet 214. Device B 216 is located on the second subnet 214 and is communicatively connected to the router 210. Devices 205, 208, and 216, and the router 210 can be communicatively connected to each other in a variety of ways, such as over a LAN, over a wide area network (WAN), over a wireless network, over a point-to-point network, through direct connections (e.g., an Ethernet cable connection between two devices), by being coupled together, etc.

The ARP client 204 begins at time 218 by sending a request to the ARP server 202 for a MAC address of the device A 208. The actions performed at time 218 can be triggered by the ARP client 204 for a variety of reasons, including the ARP client 204 starting-up. The content of the request sent to the ARP server 202 by the ARP client 204 can include the IP address of the device A 208 and an identifier of a networking interface (e.g., an Ethernet card, a wireless modem, a BLUETOOTH transceiver, a FIREWIRE port, etc.) for the host device 205 that is connected to device A 208. As described above with regard to FIG. 1, a device can have multiple networking interfaces. The host device 205 has at least one networking interface that is connected to device A 208 (e.g., device A is a next-hop neighbor of the host device 205).

At time 220, the ARP server 202 receives the persistent request from the ARP client 204 for the MAC address of device A 208. Upon receiving the request from the ARP client 204, the ARP server 202 begins persistently tracking the MAC address of device A 208. As described above with reference to FIG. 1, the ARP server 202 inserts the request into the top of a list of persistent requests maintained by ARP server 202 and sets a timer associated with the request. The request for the MAC address of device A 208 can be stored in the list of requests with the IP address and the networking interface specified by the ARP client 204. The ARP server 202 can implement the list of requests as a variety of data structures, such as a linked-list, an array, a hash table, a flat file, a database, etc.

At or around the same time the request from the ARP client 204 is added to the list of request, the ARP server 202 can initially process the request for the MAC address of device A 208 (e.g., the ARP server 202 can treat the request as though its timer expired). To process the request, the ARP server 202 sends an ARP request to the device A 208 over the specified networking interface. The ARP request can include the IP address of device A 208, the IP address of the host device 205, and the MAC address of the host device 205. The ARP request can be sent out as a broadcast (e.g., an Ethernet broadcast) over the first subnet 206 via the specified network interface. Broadcasting means that the ARP request is received by all of the devices (device A 208 and the router 210) on or connected to the first subnet 206.

The device A 208 can process the received ARP request for its MAC address at time 222. The ARP request can be received and processed by an ARP server on device A 208. Similar to the host device 205, the device A 208 can use an ARP server and ARP client (similar to the ARP server 202 and the ARP client 204 on the host device 205) to track the MAC addresses of other devices (e.g., the host device 205) on the first subnet 206. Upon receiving the ARP request, the device A 208 identifies its MAC address and sends an ARP reply back to the ARP server 202 on the host device 205. The ARP reply can include the IP address of device A 208, the MAC address of device A 208, the IP address of the host device 205, and the MAC address of the host device 205.

In addition to sending the ARP reply, the device A 208 can update its own IP address to MAC address mapping for the host device 205 using the information specified in the ARP request. For example, the ARP server on the device A 208 can use the IP address and the MAC address of the host device 205 that is specified in the ARP request to update an ARP table on device A 208.

Upon receiving the ARP reply from the device A 208, the ARP server 202 updates the ARP table on the host device 205 at time 222. Using the IP address and the MAC address for the device A 208 specified in the ARP reply, the ARP server 202 either creates or updates an entry in the ARP table that maps an IP address to a MAC address for device A 208. The ARP server 202 can additionally send the IP address to MAC address mapping for device A 208 to the ARP client 204. However, since the ARP client 204 is stateless and the ARP server 202 is stateful (meaning the ARP server 202 manages the persistent request instead of the ARP client 204), in some implementations the ARP server 202 updates the ARP table without sending a response to the ARP client 204.

At time 224, the ARP client 204 (or some other application running on the host device 205) communicates with the device A 208. To enable the communication, the ARP client 204 accesses the ARP table that now stores the IP to MAC address mapping for device A 208. Using the MAC address for device A 208, the ARP client 204 communicates with device A 208 by sending an IP packet. The IP packet includes the IP address of the host device 205 as the source and the IP address of device A 208 as the destination. The MAC address is used to navigate the IP packet to the device A 208 on the first subnet 206. For example, the IP packet can be wrapped in an Ethernet frame (e.g., MAC encapsulation of the IP packet) which uses the MAC address of device A 208 as the destination and the MAC address of the host device 205 as the source. Device A 208 receives the IP packet at time 226.

Upon expiration of a timer associated with the persistent request from the ARP client 204 for the MAC address of device A 208, the ARP server 202 rechecks the MAC address of device A 208 (time 228). The actions associated with time 228 are performed as long as the request for the MAC address of device A 208 is still contained on the list of persistent requests maintained by the ARP server 202 (e.g., the request has not been pushed-off the list by more recently received persistent requests). Since the ARP server 202 is stateful and the ARP client 204 is stateless, the ARP client 204 does not initiate the persistent reprocessing of the request (e.g., the ARP client 204 does not indicate to the ARP server 202 to recheck the IP to MAC address mapping for device A 208). As described above with reference to FIG. 1, the ARP server 202 can determine when to re-probe device A 208 using an individual timer associated with the request or using a global timer that is applicable to all requests on the list of persistent requests. The ARP server 202 resets the associated individual timer or global timer that triggered the re-probing for device A 208, so that the IP to MAC address mapping will be continually refreshed.

Even though the ARP table contains the IP to MAC address mapping for device A 208, the ARP server 202 sends the ARP request to device A 208 because the ARP server 202 is probing whether the IP to MAC address mapping has changed. As described above with reference to FIG. 1, the IP to MAC address mapping for a device can change in a variety of ways, including the device associated with the IP address changing (e.g., a different device is plugged into an Ethernet port on the first subnet 206) and the networking interface for the device changing (e.g., a new Ethernet card is installed on device A 208). The ARP server 202 sends an ARP request to the device A 208 using the information contained in the request (IP address and networking interface) for device A 208 as well as the IP to MAC address mapping for the host device 205.

The device A 208 receives the ARP request from the ARP server 202 at time 230. Similar to the actions performed at time 222, the device A 208 responds to the ARP request by sending an ARP reply that includes device A's 208 IP to MAC address mapping. Additionally, the device A 208 updates its own ARP table entry for the host device 205 using the IP to MAC address mapping for the host device 205 that was included in the ARP request. Similar to the actions performed at time 222, the ARP server 202 receives the ARP reply from the device A 208 and updates the entry for the device A 208 in the local ARP table on the host device 205 (time 232).

At time 234, the ARP client 204 sends a persistent request to the ARP server 202 for the IP to MAC address mapping of the device B 216 that is located on the second subnet 214. Similar to the persistent request sent from the ARP client 204 to the ARP server 202 for the IP to MAC address mapping for device A 208, the request sent at time 234 includes the IP address of device B 216 and the networking interface of the host device 215 that connects to device B 216.

The ARP server 202 receives and adds the request for the MAC address of device B 216 to the list of persistent requests at time 236. As part of adding the request to the list, the ARP server 202 initializes a timer associated with the request that, upon expiration, will signal that the IP to MAC address mapping for device B should be refreshed. As described above with reference to FIG. 1, adding a new request to the list of persistent requests can cause removal of the request at the bottom of the list (the least recently received or used request). In this example, as long as the fixed size for the list is greater than one, the request for device A 208 will not be removed from the list of persistent requests because no other requests have been received since the request for device A 208 (the requests for device B 216 and device A 208 will be the first and second most recently received requests, respectively).

The ARP server 202 additionally sends an initially ARP request for the IP to MAC address mapping of device B 216. Unaware that the device B 216 is on a different subnet (the second subnet 214), the ARP server broadcasts the ARP request on the first subnet 206.

At time 238, the router 210 receives the ARP request broadcast by the ARP server 202 because it is connected to the first subnet 206. Being the gateway between the first subnet 206 and the second subnet 214, the router 210 recognizes that the host device 205 and the device B 216 are on different subnets, even though the host device 205 believes them to be on the same subnet. The router 210 sends an ARP reply to the ARP server 202 indicating that the MAC address of the router 210 should be used for communicating (e.g., sending packets to) with device B 216. The ARP reply sent to the ARP server 202 includes the IP address of device B 216 mapped to the MAC address of the router 210.

The router 210 performs these actions using its own ARP server. In addition to sending the ARP reply to the ARP server 202, the router 210 updates an entry for the IP to MAC address mapping of host device 205 in an ARP table that is local to the router 210. The IP to MAC address mapping of the host device 205 is derived from the ARP request sent by the ARP server 202.

Upon receiving the ARP reply from the router 210, the ARP server 202 updates (or creates) an entry in the ARP table on the host device 205 for the IP to MAC address mapping of device B 216 (time 240). The ARP server 202 uses the IP to MAC address mapping for device B 216 that was received from the router 210. Using this IP to MAC address mapping, the ARP client 204 (or some other application on the host device 205) communicates with device B 216 by sending an IP packet to device B 216 (time 242). The IP packet is directed to device B 216 by using the associated MAC address for device B 216 from the ARP table (e.g., the IP packet is wrapped in an Ethernet frame that uses the associated MAC address as the destination). Since the associated MAC address is the MAC address of the router 210, the IP packet arrives at the router 210, which in turn forwards the packet to device B 216 (time 244). Through this process, the device B 216 receives the IP packet from the host device 205 (time 246).

At time 248, the ARP server is triggered to re-probe for the IP to MAC address mappings of device A 208 and device B 216 by the timers associated with the persistent requests for device A 208 and device B 216 expiring. The ARP server 202 can be signaled to re-probe for these IP to MAC address mappings by the expiration of a global timer or expiration of individual timers associated with each of the persistent requests. To re-probe, the ARP server 202 sends out ARP requests using the IP address and networking interface contained for each of these requests in the list of persistent requests.

At time 250, the device A 208 receives the ARP request and is re-probed for its MAC to IP address mapping for a second time in this example. The device A 208 processes the ARP request in the same fashion described above with regard to time 230 and sends an ARP reply to the ARP server 202. At time 252, the router 210 receives the ARP request for device B 216 for the same reason as described above with reference to time 238. The router 210 processes the ARP request by returning an ARP reply containing an IP to MAC address mapping for device B 216 that is the IP address of device B 216 and the MAC address of the router 210. Both the device A 208 and the router 210 update their respective ARP tables with the IP to MAC address mapping for the host device 205 that is included in the ARP requests sent out by the ARP server 202. The ARP server 202 updates the ARP table on the host device 205 using the received ARP replies from the device A 208 and the router 210 (time 254).

The ARP server 202 will continue to re-probe for updated IP to MAC address mappings of device A 208 and device B 216 at periodic intervals (as dictated by the associated timers or a global timer) so long as the requests are contained on the list of persistent requests. As described above with regard to FIG. 1, a request can be dropped from the list if a new request is received and, by adding the new request to the top of the list, the list exceeds a maximum number of requests. For example, if the maximum number of requests for the list of requests on the ARP server 202 is two and the ARP server 202 receives a persistent request for a device C (not depicted), then the persistent request for device A 208 will be removed from the list because it is the least recently received (the request for device A 208 was received before the request for device B 216).

The ARP server 202 can also remove a request from the list of requests if the ARP server 202 receives a request from the ARP client 204 to remove the request. Since a request will be persistently processed by the ARP server 202 unless it is pushed-off the list by additional requests, the ARP client 204 can instruct the ARP server 202 to remove a request before it has been pushed-off the list. For example, if the ARP client 204 decides that it is no longer interested in persistently monitoring the IP to MAC address mapping of the device A 208 after time 232, then the ARP client 204 can send a request to the ARP server 202 to remove the request related to device A 208 from the list of persistent requests. By instructing the removal of the request from the list, the ARP client 204 ensures that the request will no longer be persistently processed and that the ARP server 202 will no longer dedicate resources (memory and processing cycles) to the request.

The ARP server 202 can additionally remove a request from the list of requests if the ARP server 202 determines that a newly received request from the ARP client 204 is inconsistent with an existing request on the list. Inconsistency can be based on a difference in the IP address, the networking interface, or the MAC address. For example, assume the networking interface A for the host device 205 is connected to only device A 208. If the ARP server 202 receives a request containing the IP address 1234 and the networking interface A when there is already a request on the list containing the IP address 4321 and the networking interface A, then the ARP server 202 knows that the IP to MAC address mapping for device A 208 has changed because the IP address is different (only device A 208 is connected over interface A). Thus, the ARP server 202 can decide to remove the request on the list of persistent requests for the IP address 4321 and the interface A because it is inconsistent and no longer current. The ARP server 202 then inserts and processes the new request (IP address 1234 and interface A) at the top of the list of persistent requests.

Although the ARP server 202 moves existing requests that match a new request to the top of the list, this mechanism will not necessarily catch an inconsistency as described in the previous paragraph. For instance, in the previous example the new request (IP address 1234 and interface A) does not match the existing request (IP address 4321 and interface A). Without the mechanism to remove inconsistent request, the ARP server 202 would potentially begin processing the new request while still processing the existing request. Continuing to process the existing request would be a waste of resources (e.g., memory and processing cycles) on the host device 205 because it will not yield an accurate IP to MAC address mapping and it is redundant with the new request.

There can be multiple ARP clients, such as ARP client 204, on the host device 205 that are interacting with the ARP server 202 regarding persistent ARP requests. A single list of persistent request can be used by the ARP server 202 for these multiple ARP clients (e.g., each ARP client's persistent requests can contribute to updating the ARP table for the host device 205). In some implementations, the ARP server 202 uses a separate list of persistent requests for each networking interface on the host device 205. In further implementations, the ARP server 202 uses a separate list of persistent requests for each ARP client (e.g., ARP client 204) that is interacting with the ARP server 202.

The maximum size for a list of persistent requests can be determined in a variety of ways. In some implementations, the size of the list of persistent requests can be based on a number of devices connected to a networking interface or to the host device 205. For example, if there is one device connected to the host device 205 through a networking interface A and there is a list of requests for interface A, then the list of request for interface A can have a maximum size of one. In another example, if there are three devices connected to the host device 205, then the list of persistent requests for the host device 205 can have a maximum length of three.

In further implementations, the size of the list of persistent requests can be based on a number of devices located on a subnet (e.g., the first subnet 206) or over a collection of subnets (e.g., the first subnet 206 and the second subnet 214). For example, if there are ten devices located on the first subnet 206 and the second subnet 214, the maximum length of the list of persistent requests can ten or some percentage of ten (e.g., 25%, 50%, 75%, etc.).

In additional implementations, the maximum size of the list of persistent requests can be based on resources available to the host device 205. For example, the host device 205 can provide the ARP server 202 with a memory and processing cycle allowance. Based upon this allowance, the ARP server 202 can make a determination as to the number of persistent requests that the allowance will support and limit the size of the list of persistent requests accordingly.

Figure 3:
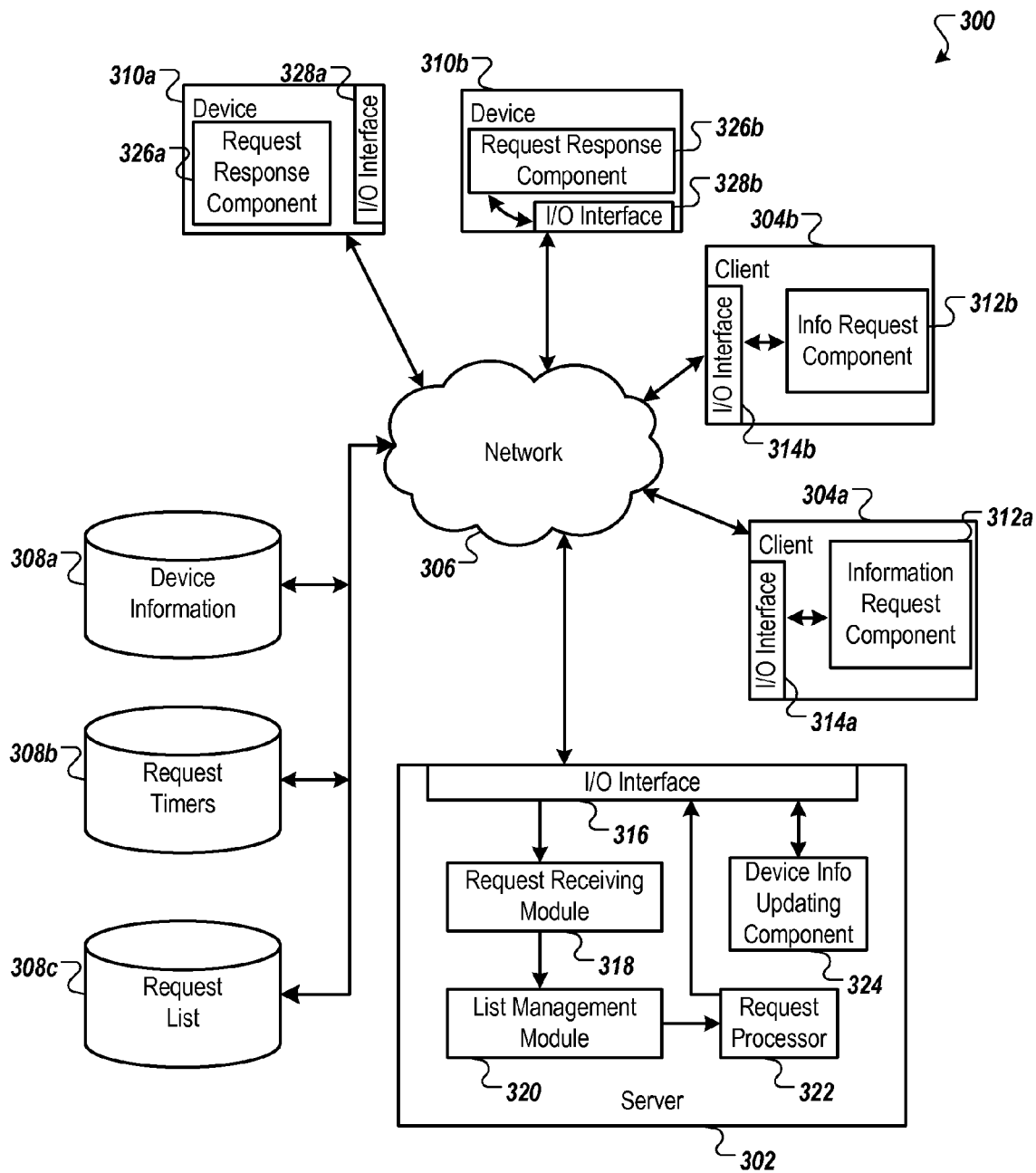
FIG. 3 shows an example system for processing persistent requests using a stateful server and a stateless client.

FIG. 3 shows an example system 300 for processing persistent requests using a stateful server and a stateless client. The system 300 is an example of an persistent request processing system in which the systems, components and techniques described below can be implemented. Although several components are illustrated, there may be fewer or more components in the system 300. Moreover, the components can be distributed on one or more computing devices connected by one or more networks or other suitable communication mediums.

The system 300 includes a stateful server 302 and one or more stateless clients 304a-b. The clients 304a-b send persistent requests for information to the serve 302 over a network 306. The network 306 can be any sort of communications medium by which the server 306 and the clients 304a-b can interact (e.g., a LAN, a WAN, a bus, a wireless network, etc.). In some implementations, the clients 304a-b and the server 302 are part of the same device (e.g., a computer, a rack-mounted server, a portable electronic computing device, etc.).

The server 302 utilizes various data repositories 308a-c to process and manage persistent requests from the clients 304a-b. The server 302 interacts with the data repositories 308a-c over the network 306. The data repositories 308a-c include a device information data repository 308a, a request timer data repository 308b, and a request list data repository 308c. The data repositories 308a-c can be implemented using a variety of data structures, such as a linked-list, a hash table, a flat file, an array, a database, etc.

The persistent requests received by the server 302 from the clients 304a-b are for information related to one or more devices 310a-b. The devices 310a-b are communicatively connected to the server 302 via the network 306. The devices 310a-b can be any of a variety of computing devices capable of communicating with another device of the network 306, such as a desktop computer, a rack-mounted server, a portable electronic computing device (e.g., a PDA, a cell phone, a laptop, etc.), a router, etc.

A persistent request for information related to the devices 310a-b is generated by the clients 304a-b using information request components 312a-b. The information request components 312a-b are configured such that they are stateless—meaning they do not keep track of a persistent request that is sent to the server 302. The information request components 312a-b are further configured to send a request to the server 302 to stop processing a previously submitted persistent request.

The information request components 312a-b send a generated persistent request to input/output (I/O) interfaces 314a-b. The I/O interfaces 314a-b can be any type of networking interface that permits communication over the network 306 (e.g., an Ethernet card, a wireless modem, a BLUETOOTH transceiver, a bus connection, etc.). The I/O interfaces 314a-b send a received persistent request over the network 306 to the server 302. The server 302 receives the persistent request at its own I/O interface 316. Like the I/O interfaces 314a-b, the I/O interface 316 can be any type of networking interface that permits communication over the network 306.

The I/O interface 316 forwards the received persistent request to a request receiving module 318 that is part of the server 302. The request receiving module 316 determines the actions the server 302 should perform in response to receiving the persistent request. For example, the request receiving module 316 can determine that the received request is new and should be added to a list of persistent requests. In another example, the request receiving module 316 can determine that the received request is already present on the list of persistent requests and can instruct the existing request (the inconsistent request on the list of persistent requests) moved to the top of the list. In yet a further example, the request receiving module 316 can determine that the received request is inconsistent with a request on the list of persistent requests and can instruct the existing request (the inconsistent request on the list of persistent requests) to be removed. The request receiving module 316 can refer to the request list data repository 308c when making such determinations for information regarding the list of persistent requests.

The request receiving module 318 instructs the list management module 320 to perform the determined actions. The list management module 320 accesses and modifies entries in the request list data repository 308c to perform these actions. The request list data repository 308c can store one or more lists of persistent requests that are being processed by the server 302. As described above with regard to FIGS. 1 and 2, a list of persistent requests can be ordered and of a fixed size. If the request receiving module 318 instructs addition of a request to the list that causes the list to exceed its maximum size, then the list management module 320 can remove one of the persistent requests from the list. Determining which of the requests to remove from the list can depend on a scheme that is used by the server 302 for ordering the requests. Under one example scheme where requests are ordered according to when they were most recently received or used by the server 302 (as described above with reference to FIGS. 1 and 2), the list management module 320 can remove the request on the list that was least recently received or used. Other schemes are possible, as described below.

The list management module 320 can additionally monitor timers associated with the requests on a list of persistent requests. Timers associated with the requests can be stored in the request timers data repository 308b. The data repository 308b can store timers in a variety of ways, including as a timestamp corresponding to the future time when the associated timer is set to expire. The list management module 320 can set timers for requests that are newly added to the list of request, delete timers for requests that are removed from the list of requests, and can reset timers that have expired.

Upon adding a request to the list of persistent requests, the list management module 320 can instruct the request processor 322 to process the request. Additionally, the list management module 320 can instruct the request processor 322 to process a request having an associated timer that has expired.

The request processor 322 is part of the server 302 and receives instructions from the list management module 320 regarding which of the requests on the list of persistent requests are to be processed. As described above, only requests that are on the list of persistent requests are processed. To process a request for information regarding one of the devices 310a-b, the request processor 322 creates a request that identifies the targeted device and that specifies the requested information. Depending on the implementation and protocol that is used, the request processor 322 can additionally include information regarding the server 302 with the request. For example, the ARP server described with reference to FIG. 2 sends an ARP request to a targeted device seeking the IP to MAC address mapping of the device. Included with the ARP request is the IP address of the targeted device (to identify the device) and the IP to MAC address mapping of the ARP server.

The request processor 322 sends a generated request to the I/O interface 316, which in turn forwards the generated request through the network 306 to one of the devices 310a-b. The devices 310a-b receive the request at I/O interfaces 328a-b (similar to the I/O interfaces 314a-b and 316) and forward the request to request response components 326a-b. The request response components 326a-b identify the requested information regarding the devices 310a-b generate a reply that includes the requested information. The request response components 326a-b send a generated reply to the server 302 through the I/O interfaces 328a-b, the network 306, and to the I/O interface 316. For example, the devices 310a can generate and send to the server 302 an ARP reply that includes the IP to MAC address mapping for the device 310a.

The I/O interface 316 receives the reply from the devices 310a-b and forwards it to a device information updating component 324 on the server 302. The device information updating component 324 can update the device information data repository 308a using the information contained in the received reply. For example, if an APR reply is received that contains an IP to MAC address mapping for the device 310a, the device information updating component 324 can update the device information data repository 308a (e.g., an ARP table) using the mapping. In some implementations, the device information updating component 324 additionally sends the received information to the clients 304a-b. In some implementations, the clients 304a-b have access to the device information data repository 308a through the network 306.

Figure 4:
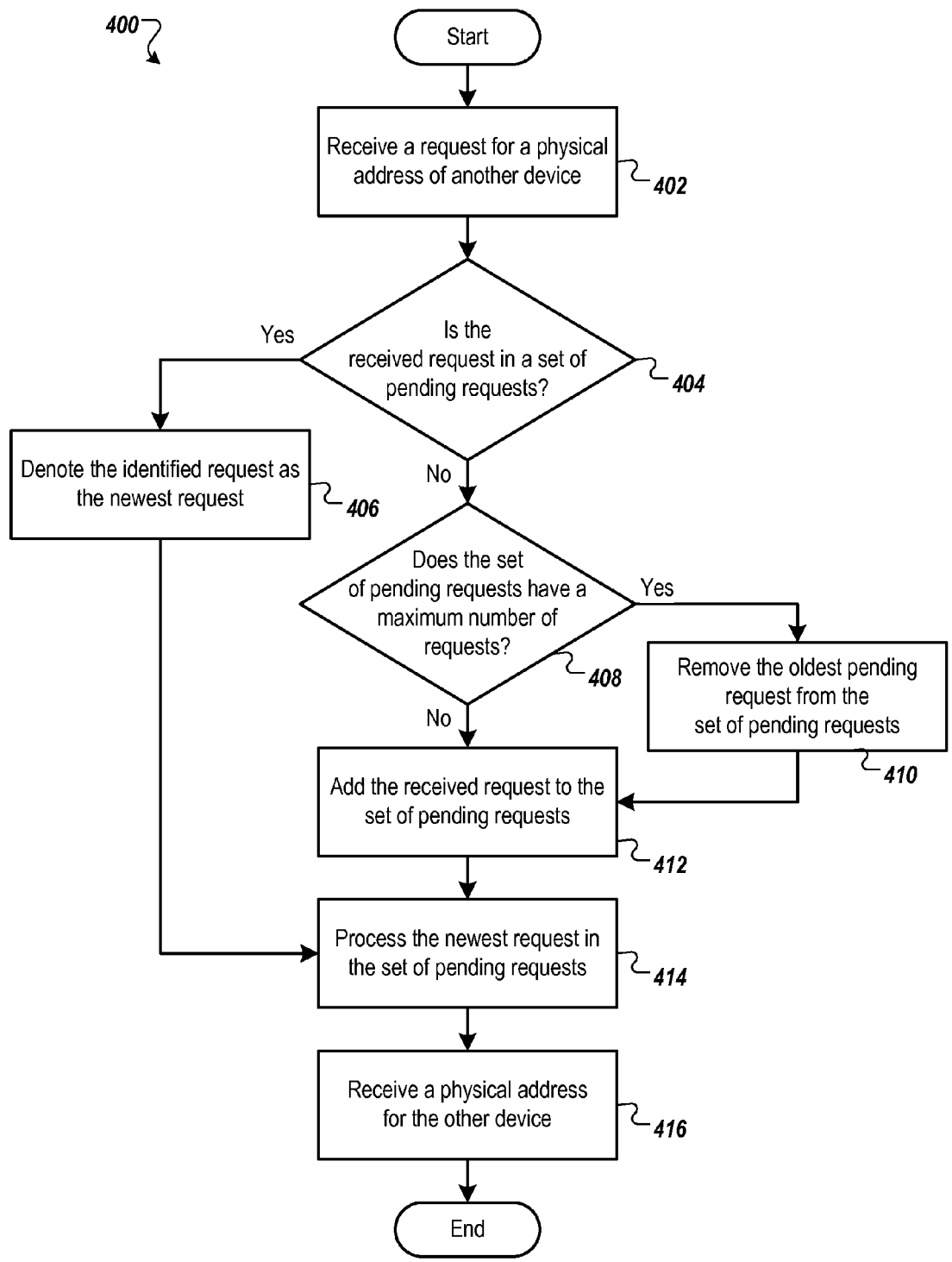
FIG. 4 is a flow chart describing an example technique for processing persistent client requests using a stateful server and a stateless client.

FIG. 4 is a flow chart describing an example technique 400 for processing persistent client requests using a stateful server and a stateless client. The technique 400 can be performed by a variety of systems, for example, by the server system 302, as described with reference to FIG. 3.

At step 402, a request is received at a device for a physical address of another device. A determination is made as to whether the received request is already listed in a set of pending requests (step 404). If the received request is determined to already be present, the identified request in the set of pending requests is denoted as the newest request (step 406). For example, the server 302 determines receives a request for information regarding the devices 310a-b from one of the clients 304a-b and determines whether the received request is already present in a list of persistent requests (pending requests). If the received request is already present, the server 302 moves the request to the top of the list, which indicates that it is the newest request.

If the received request is not present in the set of pending requests, then a determination is made as to whether the set of pending requests contains a maximum number of requests (step 408). If the maximum number of requests is contained in the set of pending requests, then the oldest pending request is removed from the set of pending requests (step 410). If the set of pending requests does not have a maximum number of request (or if the oldest pending request has already been removed in step 410), then the received request is added to the set of pending requests (step 412).

The newest request in the set of pending requests is processed (step 414). For example, an ARP request that is received by an ARP server is added to the top of a list of pending ARP requests and then processed as the newest ARP request. Processing a pending request involves sending a message to the other device specified in the newest request. For example, an ARP request that seeks the MAC address of the other device can be sent to the other device.

In response to processing the newest request and sending a message to the sought device, the physical address for the other device is received (step 416). For example, in response to sending an ARP request to a device, a MAC address for the device is received. After receiving the physical address, the technique 400 ends.

Figure 5:
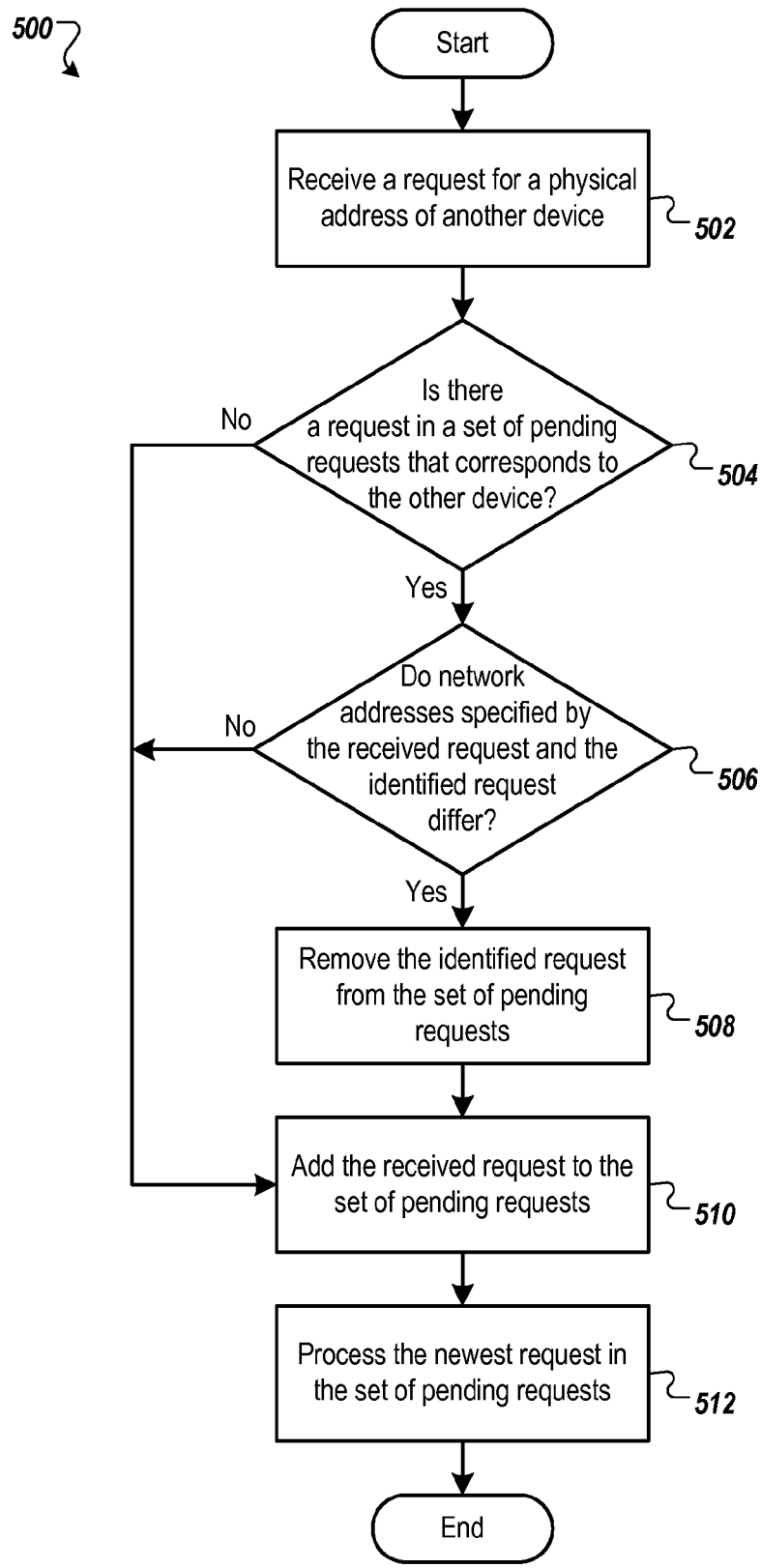
FIG. 5 is a flow chart describing another example technique for processing persistent client requests using a stateful server and a stateless client.

FIG. 5 is a flow chart describing another example technique 500 for processing persistent client requests using a stateful server and a stateless client. The technique 500 can be performed by a variety of systems, for example, by the server system 302, as described with reference to FIG. 3. Additionally, the technique 500 can be performed in-part or in-whole with the technique 400.

At step 502, a request for a physical address of another device is received. A determination is made as to whether there is a request in a set of pending requests that corresponds to the other device (step 504). If there is not a request that corresponds to the other device from the set of pending requests, then the received request is added to the set of pending requests (step 510). If there is a request that corresponds to the other device identified from the set of pending requests, then a determination is made as to whether network addresses specified by the received request and the identified request differ (step 506). If the network addresses differ, then the identified request is removed from the set of pending requests (step 508). If the network addresses do not differ, then the identified request in the set of pending requests can be moved (added) to the top of the set of pending requests (step 510).

For example, a persistent ARP request can specify an IP address and a networking interface for a device to which the ARP request pertains. An ARP request on a list of persistent ARP requests (pending requests) can be identified as pertaining to the requested device based on the specified networking interfaces of the two ARP requests (the received request and the identified request) matching. If the IP address differ for these two ARP requests that have matching network interfaces, then the ARP request on the list of persistent ARP requests is removed.

After removing the identified request from the set of pending requests (step 508), the received request is added to the set of pending requests (step 510). Since it is the most recently added request, the received request can be termed the newest request on the set of pending requests. The newest request for the set of pending requests is then processed (step 512). Processing of the newest of the set of pending requests can be performed similarly to steps 414 and 416, as described above with regard to FIG. 4.

Figure 6:
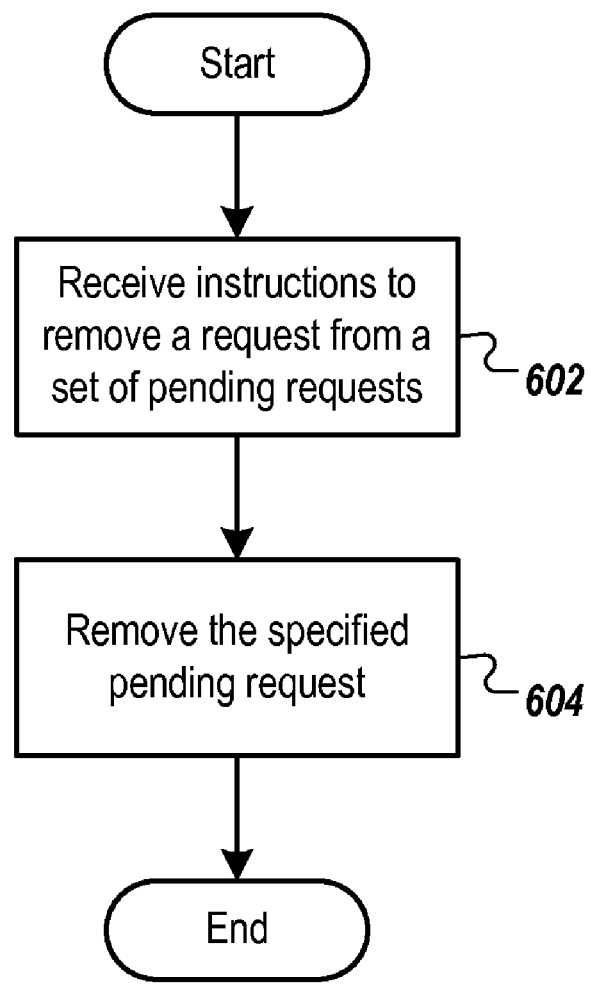
FIG. 6 is a flow chart describing another example technique for removing a persistent request from a list of pending persistent requests.

FIG. 6 is a flow chart describing another example technique 600 for removing a persistent request from a list of pending persistent requests. The technique 600 can be performed by a variety of systems, for example, by the server system 302, as described with reference to FIG. 3. Additionally, the technique 600 can be performed in-part or in-whole with the techniques 400 and 500.

At step 602, instructions are received to remove a request from a set of pending requests. The specified pending request is then removed from the set of pending requests (step 604). For example, an ARP request can be continually processed as long as it is on the list of persistent and pending ARP requests. An stateless ARP client that has submitted the request may desire to stop monitoring the IP to MAC address mapping for the ARP request. In response, the ARP client can instruct a stateful ARP server that is processing the request to stop processing the ARP request. To stop processing the ARP request, the ARP server can remove the request from the list of pending requests.

In additional implementations not described above, various orderings of pending persistent requests can be used by a stateless server when attempting to determine a newest request to process or an oldest request to remove. For instance, in some implementations the stateless server determines the oldest pending request to remove based upon when each of the existing requests was last processed by the server. For example, a pending request that was most recently processed by the server can be removed from the list of pending requests. By removing the most recently processed request from the list, the server places the greatest value on pending requests having the least current information (the requests for which the received information was received the longest ago).

In other example implementations, the server determines a pending persistent request to remove from the list of pending requests based upon the information received from processing each of the requests. For example, a pending request for which the received information has been the most consistent can be removed from the list (e.g., a request for a IP to MAC address mapping for a desktop computer with a wired network connection and static IP address). In such an example, the stateful server values refreshing information for devices having more volatile associated information over devices that have more consistent associated information.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   receiving at a first device a first request for a physical address of a second device different from the first device, wherein the first request specifies a network address of the second device;
   identifying a previously received second request in a set of pending requests that is restricted in size to a maximum number of requests and that is ordered based on when the requests were received by the first device;
   determining that the network address specified in the first request and a network address specified in the second request differ;
   removing the second request from the set of pending requests and adding the first request to the set of pending requests; and
   processing a newest request in the set of pending requests by sending a message to the second device and receiving the physical address responsive to the message.

2. The method of claim 1 wherein the second device is on a same subnet as the first device and wherein the physical address is that of the second device.

3. The method of claim 1 wherein the second device is on a different subnet as the first device and wherein the physical address is that of a router.

4. The method of claim 1 wherein the physical address is a Media Access Control (MAC) address and wherein the message is an Address Resolution Protocol (ARP) request.

5. The method of claim 1 wherein the first request specifies a network interface on the first device and wherein the set of pending requests is for the specified network interface.

6. The method of claim 1 wherein a pending request is associated with a respective timer, further comprising processing the pending request when the respective timer expires and denoting the pending request as the newest request in the set of pending requests.

7. The method of claim 1, further comprising:
   receiving at the first device a third request for a physical address of a third device different from the first device, wherein the third request specifies a network address of the third device;
   identifying that the third request was previously received based on the third request being included in the set of pending requests;
   in response to identifying the third request in the set of pending requests, denoting the third request as the newest request in the set of pending requests; and
   processing the newest request in the pending requests to obtain a physical address for the third device.

8. The method of claim 1, further comprising:
   receiving at the first device an instruction to remove the first request from the set of pending requests; and
   removing the first request from the pending requests.

9. A computer program product, the computer program product encoded on a computer-readable storage device, operable to cause data processing apparatus to perform operations comprising:
   receiving at a first device a first request for a physical address of a second device different from the first device, wherein the first request specifies a network address of the second device;
   identifying a previously received second request in a set of pending requests that is restricted in size to a maximum number of requests and that is ordered based on when the requests were received by the first device;
   determining that the network address specified in the first request and a network address specified in the second request differ;
   removing the second request from the set of pending requests and adding the first request to the set of pending requests; and
   processing a newest request in the set of pending requests by sending a message to the second device and receiving the physical address responsive to the message.

10. The computer program product of claim 9 wherein the physical address is a MAC address and wherein the message is an ARP request.

11. The computer program product of claim 9 wherein the first request specifies a network interface on the first device and wherein the set of pending requests is for the specified network interface.

12. The computer program product of claim 9 wherein a pending request is associated with a respective timer, further comprising processing the pending request when the respective timer expires and denoting the pending request as the newest request in the set of pending requests.

13. The computer program product of claim 9, the computer program product further encoded on the computer-readable medium, operable to cause data processing apparatus to perform operations further comprising:
   receiving at the first device a third request for a physical address of a third device different from the first device, wherein the third request specifies a network address of the third device;
   identifying that the third request was previously received based on the third request being included in the set of pending requests;
   in response to identifying the third request in the set of pending requests, denoting the third request as the newest request in the set of pending requests; and
   processing the newest request in the pending requests to obtain a physical address for the third device.

14. A system comprising:
   a computer readable medium including a program product; and
   one or more processors configured to execute the program product and perform operations comprising:
      receiving at a first device a first request for a physical address of a second device different from the first device, wherein the first request specifies a network address of the second device;
      identifying a previously received second request in a set of pending requests that is restricted in size to a maximum number of requests and that is ordered based on when the requests were received by the first device;
      determining that the network address specified in the first request and a network address specified in the second request differ;
      removing the second request from the set of pending requests and adding the first request to the set of pending requests; and
      processing a newest request in the set of pending requests by sending a message to the second device and receiving the physical address responsive to the message.

15. The system of claim 14 wherein the physical address is a MAC address and wherein the message is an ARP request.

16. The system of claim 14 wherein the first request specifies a network interface on the first device and wherein the set of pending requests is for the specified network interface.

17. The system of claim 14 wherein a pending request is associated with a respective timer, further comprising processing the pending request when the respective timer expires and denoting the pending request as the newest request in the set of pending requests.

18. The system of claim 14, the one or more processors further configured to execute the program product and perform operations further comprising:
   receiving at the first device a third request for a physical address of a third device different from the first device, wherein the third request specifies a network address of the third device;
   identifying that the third request was previously received based on the third request being included in the set of pending requests;
   in response to identifying the third request in the set of pending requests, denoting the third request as the newest request in the set of pending requests; and
   processing the newest request in the pending requests to obtain a physical address for the third device.

* * * * *